US012651113B1

(12) United States Patent
Agrawal et al.

(10) Patent No.: US 12,651,113 B1
(45) Date of Patent: Jun. 9, 2026

(54) DOCUMENT INTELLIGENCE SYSTEM

(71) Applicant: Mistral AI, Paris (FR)

(72) Inventors: Pravesh Agrawal, Mountain View, CA (US); Sumukh Koteshwara Aithal, Mountain View, CA (US); Jean-Malo Delignon, Paris (FR); Sandeep Subramanian, San Francisco, CA (US); Guillaume Lample, Paris (FR)

(73) Assignee: Mistral AI, Paris (FR)

(*) Notice: Subject to any disclaimer, the term of this patent is extended or adjusted under 35 U.S.C. 154(b) by 0 days.

(21) Appl. No.: 19/457,074

(22) Filed: Jan. 22, 2026

Related U.S. Application Data

(60) Provisional application No. 63/952,250, filed on Dec. 31, 2025.

(51) Int. Cl.

| | |
|---|---|
| ***G06V 30/416*** | (2022.01) |
| ***G06F 40/103*** | (2020.01) |
| ***G06F 40/169*** | (2020.01) |
| ***G06F 40/177*** | (2020.01) |
| ***G06V 30/18*** | (2022.01) |
| ***G06V 30/19*** | (2022.01) |
| ***G06V 30/414*** | (2022.01) |

(52) U.S. Cl.
CPC .......... *G06F 40/169* (2020.01); *G06F 40/103* (2020.01); *G06F 40/177* (2020.01); *G06V 30/18* (2022.01); *G06V 30/191* (2022.01); *G06V 30/414* (2022.01); *G06V 30/416* (2022.01)

(58) Field of Classification Search
CPC .... G06F 40/169; G06F 40/103; G06F 40/177; G06V 30/416; G06V 30/18; G06V 30/191; G06V 30/414
See application file for complete search history.

(56) References Cited

U.S. PATENT DOCUMENTS

| | | | | |
|---|---|---|---|---|
| 2021/0406451 | A1* | 12/2021 | Iyer | G06V 30/40 |
| 2025/0348762 | A1* | 11/2025 | Telang | G06N 5/04 |
| 2026/0017965 | A1* | 1/2026 | Anthony | G06V 30/1448 |

OTHER PUBLICATIONS

Jose D. Bermudez Castro et al., Improvement Optical Character Recognition for Structured Documents using Generative Adversarial Networks, Sep. 1, 2021, International Conference on Computational Science and Its Applications, pp. 285-292 (Year: 2021).*
Ido Kissos et al., Image and Text Correction Using Language Models, Apr. 1, 2017, International Workshop on Arabic Script Analysis and Recognition, pp. 158-162 (Year: 2017).*

* cited by examiner

*Primary Examiner* — Tam T Tran
(74) *Attorney, Agent, or Firm* — Buchalter; Jason W. Croft

(57) ABSTRACT

A method may include obtaining, from a user device, an electronic document to be processed by a model. The method may also include obtaining an optical character recognition output of the electronic document. The method may further include obtaining, from the user device, an output configuration. The method may also include generating a first output and a second output based on the electronic document and the optical character recognition output. The first output and the second output may be defined by the output configuration. The method may further include transmitting the first output and the second output to the user device. The method may also include obtaining a feedback from the user device. The method may further include updating the model using the feedback from the user device.

20 Claims, 6 Drawing Sheets

Obtain An Electronic Document To Be Processed By A Model — *305*

Obtain An Optical Character Recognition Output Of The Electronic Document — *310*

Obtain An Output Configuration — *315*

Generate A First Output And A Second Output Based On The Electronic Document And The Optical Character Recognition Output — *320*

Transmit The First Output And The Second Output To A User Device — *325*

Obtain A Feedback From The User Device — *330*

Update The Model Using The Feedback — *335*

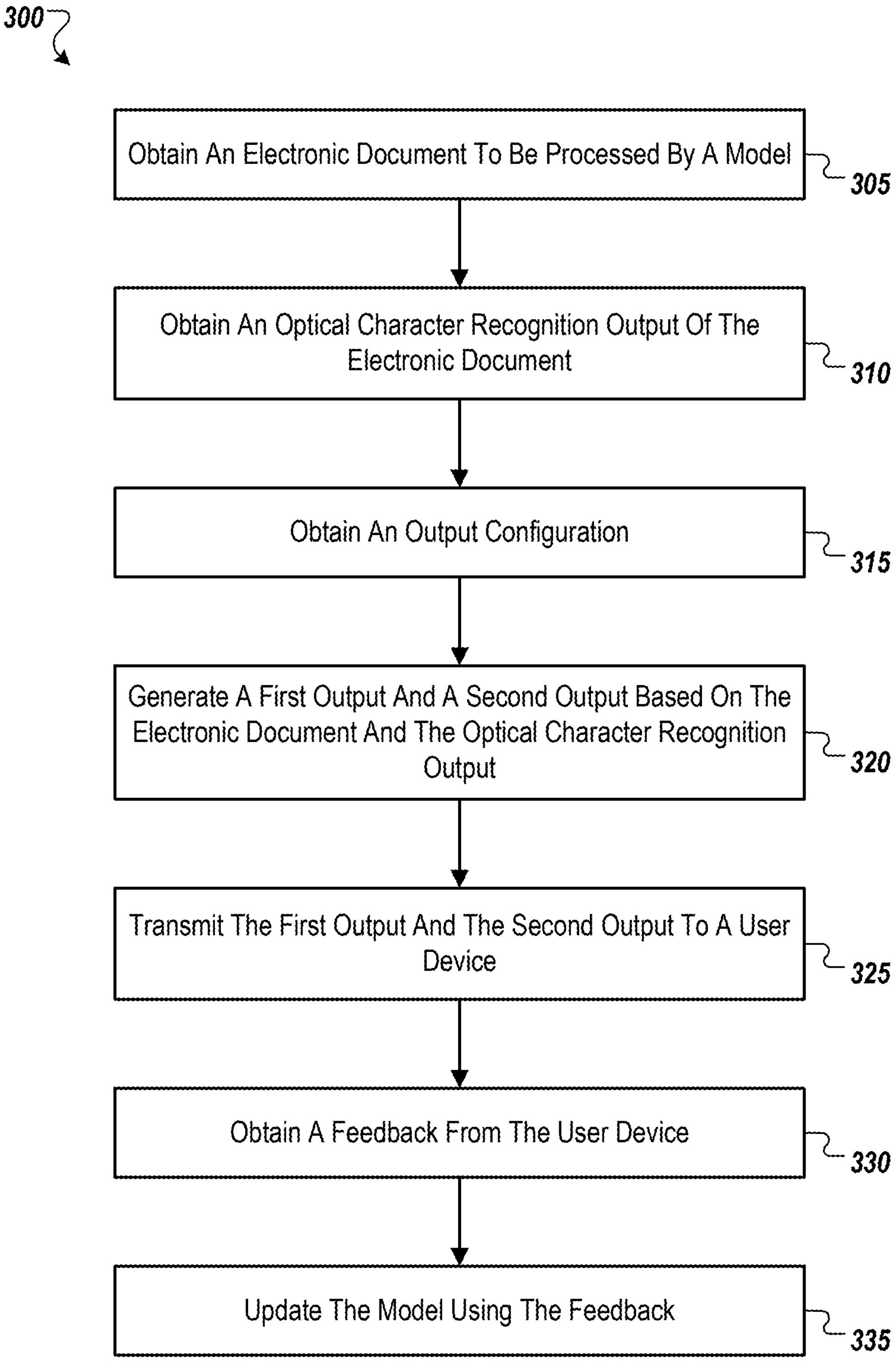

*FIG. 3*

DOCUMENT INTELLIGENCE SYSTEM

CROSS-REFERENCE TO RELATED APPLICATIONS

This application claims priority to U.S. Provisional Application No. 63/952,250, filed Dec. 31, 2025, which is incorporated herein by reference in its entirety.

TECHNICAL FIELD

This disclosure generally relates to optical character recognition, and more specifically, to annotation by a document intelligence system to an electronic document.

BACKGROUND

Unless otherwise indicated herein, the materials described herein are not prior art to the claims in the present application and are not admitted to be prior art by inclusion in this section.

Digitized documents (or electronic documents) may include scanned images, compressed PDFs, layered documents, and various unstructured or semi-structured files. Some methods for processing such digitized documents may include using one or more processing models to identify text included therein via optical character recognition (OCR). While the processing models may be operable to perform OCR, conventional OCR techniques typically do not do anything beyond the OCR processing. Further, conventional OCR techniques may have difficulty identifying and/or annotating the OCR text in an instructive manner that may be useful and/or intuitive to a user.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an example embodiment, a computing system may include a processor and a memory. The memory may store instructions that, when executed by the processor, cause the computing system to obtain, from a user device, an electronic document to be processed by a model. The computing system may also obtain an optical character recognition output of the electronic document. The computing system may further obtain, from the user device, an output configuration. The computing system may also generate a first output and a second output based on the electronic document and the optical character recognition output. The first output and the second output may be defined by the output configuration. The computing system may further transmit the first output and the second output to the user device. The computing system may also obtain a feedback from the user device. The computing system may further update the model using the feedback from the user device.

In another embodiment, a method may include obtaining, from a user device, an electronic document to be processed by a model. The method may also include obtaining an optical character recognition output of the electronic document. The method may further include obtaining, from the user device, an output configuration. The method may also include generating a first output and a second output based on the electronic document and the optical character recognition output. The first output and the second output may be defined by the output configuration. The method may further include transmitting the first output and the second output to the user device. The method may also include obtaining a feedback from the user device. The method may further include updating the model using the feedback from the user device.

The objects and advantages of the embodiments will be realized and achieved at least by the elements, features, and combinations particularly pointed out in the claims.

Both the foregoing general description and the following detailed description are given as examples and are explanatory and not restrictive of the invention, as claimed.

DESCRIPTION OF DRAWINGS

Example implementations will be described and explained with additional specificity and detail using the accompanying drawings in which:

FIG. 3 illustrates a flowchart of an example method for document annotation using a document intelligence system;

DETAILED DESCRIPTION

Optical Character Recognition (OCR) describes technology that converts text from images or scanned documents into machine-readable text. OCR typically works by analyzing shapes and patterns of characters in an image and then mapping them to corresponding letters, numbers, and symbols. OCR is widely used to digitize printed materials, automate data entry, and enable search and editing of documents that were originally paper-based.

OCR may provide the machine-readable text and may sometimes include image recognition associated with non-text objects in the document. In many instances, context associated with the text and/or non-text objects may not be retained and/or available from the OCR document. In many instances, particular fields that may be of interest to a user and that may appear in a document may not include any indication or annotation associated therewith to identify the particular field within the document. Additionally, Aspects of the present disclosure address these and other shortcomings with conventional OCR systems by providing a document intelligence system including a language model configured to obtain an electronic document and a user-defined output configuration, and the model may add annotations to the document and generate multiple outputs of the document, which may include a structured view identifying fields of interest to the user. The model may be operable to structure the output therefrom using the user-defined output configuration such that the user may obtain particular content from the document as they provided in the output configuration.

In some instances, the document intelligence system may be operable to provide both an output and the original document to the viewer for a side-by-side display, such that the viewer may be able to verify the accuracy of the extraction and annotation process. For example, in a legal document processing scenario, the document intelligence system may extract key clauses and annotations, presenting them alongside the original document for verification. In a financial document processing scenario, the document intelligence system may extract and annotate financial figures, dates, and client details, allowing the user to compare the extracted data with the original document. In a medical document processing scenario, the document intelligence system may identify and annotate patient information, treatment details, and medical history, ensuring that the extracted data is accurate and complete. In instances in which one or more discrepancies may be determined by the model, the discrepancies may be highlighted for the user in the display, which may prompt a user feedback to the document intelligence system. The document intelligence system may use the feedback to update the output configuration and/or retrain the model, such that subsequent processing may yield an output that more closely aligns with expectations from the user.

Figure 1:
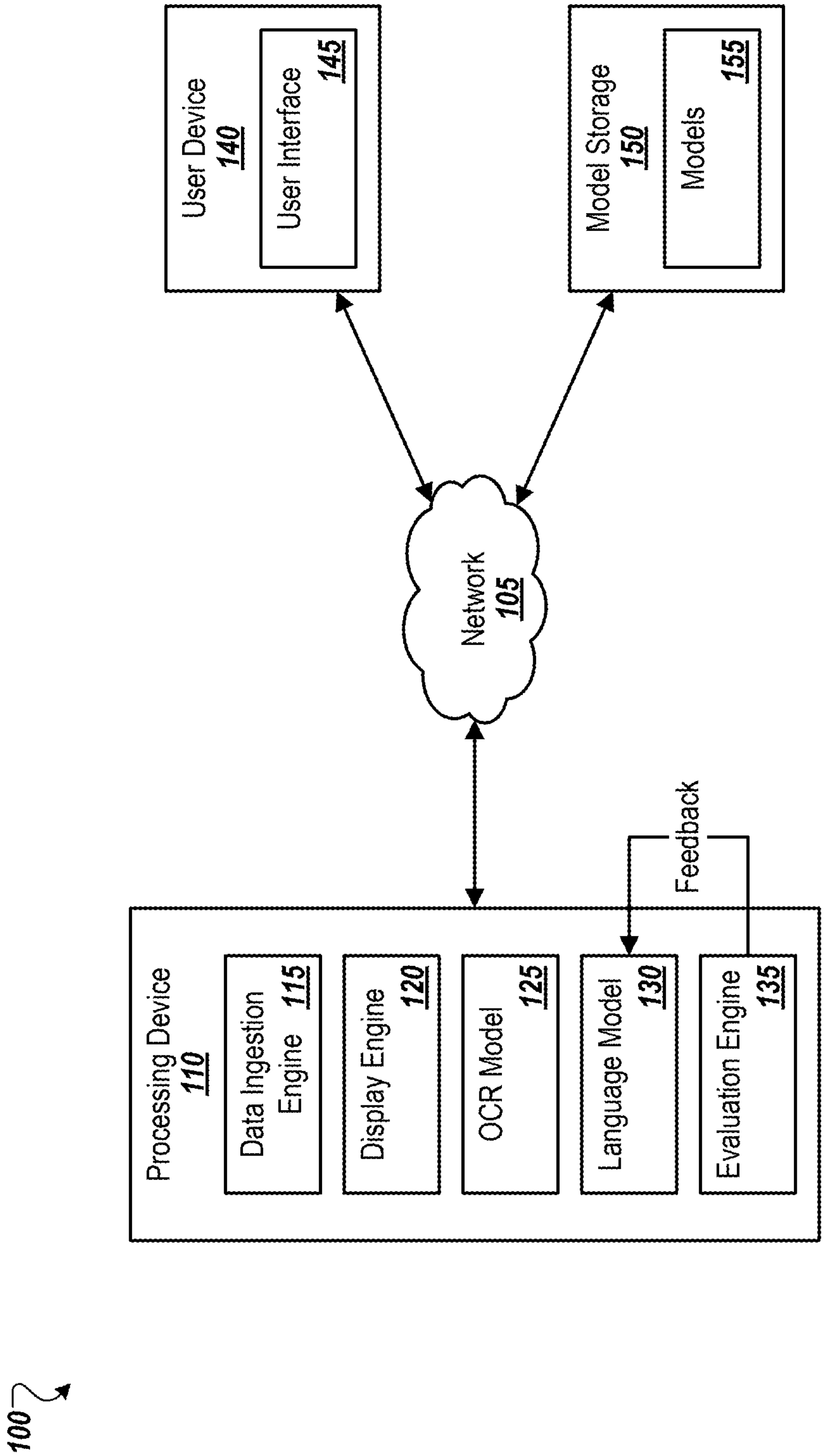
FIG. 1 illustrates a block diagram of an example system to perform document intelligence operations.

FIG. 1 illustrates a document intelligence system 100 to perform document intelligence operations, including annotations to an electronic document. The document intelligence system 100 may include a network 105, which may function as a central communication backbone within the document intelligence system 100. The network 105 may enable secure and efficient bidirectional data exchange between at least a processing device 110, a user device 140, and/or a model storage 150. The network 105 may facilitate the transmission of electronic documents, such as PDFs, pictures, document scans, digital photographs, etc., from the user device 140 to a data ingestion engine 115 within the processing device 110 for preprocessing.

The network 105 may provide low-latency communication that may provide real-time updates to a user interface 145 on the user device 140, which may include visual outputs, annotations, and/or processing statistics. In some instances, the network 105 may be a wireless network and/or a wired network to facilitate communications between the connected elements in the document intelligence system 100.

The processing device 110 may be operable to execute the core operations of the document intelligence system 100. The operations may include ingesting electronic documents via the data ingestion engine 115, processing text and images using the OCR model 125, analyzing and annotating content using the language model 130, evaluating results with the evaluation engine 135, and/or generating visual outputs via the display engine 120. The processing device 110 may coordinate the operations to transform raw electronic documents into structured and/or annotated documents based on user-defined output configurations.

The data ingestion engine 115 may receive and/or preprocesses electronic documents, such as PDFs, scans, and/or images, from the user interface 145. The data ingestion engine 115 may normalize and/or optimize the electronic documents for subsequent extraction by the OCR model 125. The data ingestion engine 115 may ensure documents may be formatted, segmented, and/or prepared for accurate text and image extraction.

The display engine 120 may be operable to render the electronic documents and/or the visual results, including annotated text, structured data, and/or extracted images, into user-friendly visual outputs (e.g., markdown, HTML, or JSON). The display engine 120 may dynamically present the various displays in the user interface 145, which may enable real-time review, comparison of the visual outputs the original document, and/or interactive feedback.

The OCR model 125 may extract raw text and/or images from the electronic documents using optical character recognition and/or converting scanned or image-based content into machine-readable data. The OCR model 125 may identify text regions, layouts, and/or embedded images, and may prepare the content for further analysis by the language model 130.

The language model 130 may process the text and/or images extracted by the OCR model 125 to perform advanced content analysis, including natural language understanding, entity recognition, and/or context-aware annotation. The language model 130, which may be a transformer-based model such as BERT or GPT fine-tuned for document annotation tasks, may process the text and/or images extracted by the OCR model 125 to perform advanced content analysis, including natural language understanding, entity recognition, and/or context-aware annotation. The OCR model 125 may be a convolutional neural network (CNN) based model, such as Tesseract, fine-tuned for text and image extraction. Both models may be trained using a combination of supervised and unsupervised learning techniques on labeled and unlabeled documents. Transfer learning may be used to fine-tune pre-trained models on domain-specific data, and user feedback may be used to continuously improve the models through online learning.

The language model 130 may be trained using a combination of supervised and unsupervised learning techniques, and the language model 130 may be fine-tuned based on user feedback to improve accuracy and relevance. The interaction between the OCR model 125 and the language model 130 may involve the OCR model 125 extracting raw text and images from the electronic document, which are then passed to the language model for further analysis. The language model 130 may use this extracted content to generate structured data outputs, such as schema-based annotations, by interpreting the user-defined output configuration.

The language model 130 may automatically generate structured data outputs, such as schema-based annotations, by interpreting user-defined output configurations. The language model 130 may be operable to obtain and ingest feedback, such as from a user of the user interface 145, to iteratively refine results to improve accuracy and relevance in real time. Additionally, the language model 130 may ensure compliance with specified formats (e.g., markdown, JSON, etc.) and may integrate seamlessly with the display engine 120 to present actionable insights in the user interface 145.

Either of the OCR model 125 and/or the language model 130 may be obtained from the model storage 150, where various models 155 may be stored for use, such as in the document intelligence system 100. In some instances, the models 155 may be pre-trained to perform specific tasks, such as OCR operations, annotation of documents, automatically generating a schema for an electronic document, and so forth. In some instances, as the language model 130 may be refined by feedback from the evaluation engine 135, the processing device 110 may update and/or transmit the updated language model 130 to the model storage 150 for subsequent use.

The evaluation engine 135 may assess the accuracy and relevance of the visual outputs generated by the language model 130. The evaluation engine 135 may compare the annotated data and visual outputs against the electronic document and schemas to identify any discrepancies between the two. The evaluation engine 135 may collect user feedback from the user interface 145 to refine the language model 130 and/or the OCR model 125, which may contribute to continuous improvement in document processing quality and enabling adaptive learning for future tasks. Feedback collected from the user interface 145 may be used to refine the language model 130 and/or the OCR model 125. This feedback loop may involve collecting user corrections, comparing them with the original model outputs, and using this information to retrain the models. The feedback mechanism may include logging user corrections, analyzing patterns in the corrections, and updating the models to reduce errors and improve performance over time.

The user device 140 may include any type of electronic device operable to interface with other devices and systems in the document intelligence system 100. The user device 140 may include, but not be limited to a personal computer, a laptop computer, a tablet computer, a mobile device, and the like.

The user interface 145 may serve as a central hub for user interaction within the document intelligence system 100, which may include an intuitive experience for document processing, annotation, and analysis. A user of the user interface 145 may upload electronic documents in various formats, such as PDFs or images, through drag-and-drop functionality or file browsing, with the user interface 145 providing a real-time preview of the uploaded content. The user interface 154 may enable a user to configure output settings (e.g., output configurations), including defining structured schemas, determining image extraction, and/or specifying annotation requirements, either by using a visual builder for ease of use, or by a code editor for advanced customization. Once processing by the processing device 110 is complete, the user interface 145 may present the visual output in a clear, organized manner, allowing a user to review annotated text, structured data, and extracted images in multiple formats, such as markdown, HTML, and/or JSON. A user can compare the visual output side-by-side with the original document, with visual indicators highlighting discrepancies or key annotations for easy validation. The user interface 145 may support real-time feedback submission, enabling a user to refine and improve the accuracy of the underlying OCR model 125 and/or and the language model 130. The user interface 145 may provide options to export the visual output in various formats, ensuring a user can utilize the visual outputs for further analysis or integration into other workflows.

In some instances, the user-defined output configurations may define how the electronic document may be processed, annotated, and/or presented to the user. The output configuration may serve as a bridge between the electronic documents and structured, actionable outputs generated by the document intelligence system 100. In some instances, the output configuration may cause the output from the document intelligence system 100 to be tailored to the particular requirements provided by the user via the user interface 145, whether for data extraction, document annotation, or structured formatting. The output configuration may include schema definitions, formatting preferences, image extraction rules, and/or compliance-related options, such as header and footer inclusion. The schema definitions may specify the fields to be identified and annotated within the electronic document, including field names, types, descriptions, and whether the fields are required or optional. For example, a user processing invoices might define a schema with fields for client details, invoice dates, and total amounts. The formatting preferences may determine the structure of the output, such as markdown, HTML, or JSON. Image extraction rules may specify whether images embedded in the electronic document should be extracted and included in the visual output. Compliance-related options may ensure that the output adheres to specific regulations or standards, such as retaining headers and footers for legal or financial documents.

The schema may define fields to be identified and annotated within the electronic document. The user can create the schema using a JSON schema code editor or a visual builder that may eliminate individual coding. The schema may include elements such as a field name, a field type, a description associated with the field name that may guide the language model 130 in identifying relevant content, and/or various toggles to mark fields as required or optional. For example, a user processing invoices might define a schema with fields for client details, invoice dates, and total amounts, causing the document intelligence system 100 to identify and annotate such elements. Alternatively, or additionally, the document intelligence system 100 can automatically generate a schema by analyzing the electronic document and identifying common fields, providing a quick starting point for users unfamiliar with JSON syntax. The automatic schema generation may use the ability of the language model 130 to recognize patterns and structures within the electronic document.

The output configuration may include an image extraction toggle, which may determine whether images embedded in the electronic document may be extracted and included in the visual output. When enabled, the image extraction toggle may cause the document intelligence system 100 to identify and extract images and/or similar non-text objects from the electronic document. The extracted images may be processed separately from the text content of the electronic document, and may be included in the visual output according to the user's preferences defined in the output configuration. For example, images may be displayed inline within the text content or as separate image elements, and may be resized or cropped to fit within the structure of the output. When disabled, the document intelligence system may focus on text extraction, potentially reducing processing time and output size. The structure of the output (e.g., markdown, HTML, JSON) may also affect how images are presented in the visual output.

When the image extraction toggle is enabled, the OCR model 125 may identify and processes the images and may add them to the visual output. Alternatively, or additionally, disabling the image extraction toggle may allow the document intelligence system 100 to perform the text extraction, which may optimize processing speed and/or may reduce the size of the visual output. Alternatively, or additionally, the output configuration may support a header and footer toggle, which may conform to various regulations. For instance, legal or financial documents may include requirements that headers and footers be retained for audit purposes, and the header and footer toggle in the output configuration may cause such elements to be included.

In some instances, a user can customize the visual output by selecting from multiple formatting options in the output configuration, including markdown for structured text, HTML for table rendering, structured JSON for machine-readable data, and/or raw text for simplicity. The document intelligence system 100 may support different processing modes, such as OCR-only mode for raw text extraction, bounding box annotation mode for analyzing image-level portions of the electronic document, and document annotation mode for applying the schema to the entire electronic document.

The output configuration may be applied dynamically during processing by the document intelligence system 100. Once defined, the document intelligence system 100 may use the output configuration to guide the OCR model 125 and/or the language model 130 in extracting and annotating content in the electronic document. The visual output may be displayed alongside the original electronic document, enabling the user to compare the visual output with the electronic document. The user can provide feedback, obtained by the evaluation engine 135, to refine the schema, such as upon determining a discrepancy. In such instances, the document intelligence system 100 may use the user feedback to update the language model 130. The document intelligence system 100 may support saving and loading output configurations, allowing users to reuse settings for similar documents. For example, a user processing a batch of invoices can save the associated output configuration, including the associated schema, and apply the output configuration to subsequent electronic documents.

Figure 2:
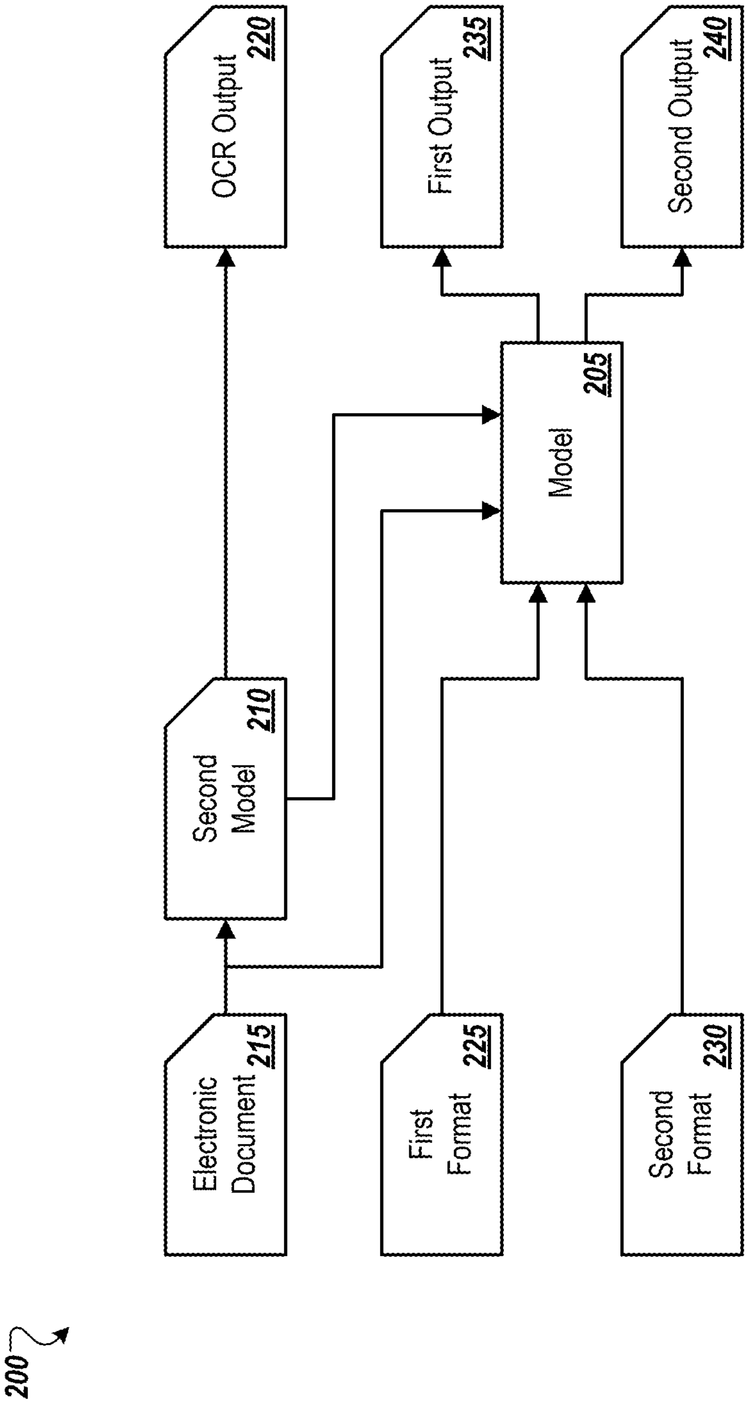
FIG. 2 illustrates a block diagram of an example workflow of a document intelligence system.

FIG. 2 illustrates a block diagram of an example workflow of a document intelligence system 200. The document intelligence system 200 may include a model 205 that may be operable to at least annotate an electronic document 215 based on a user-define output configuration. In some instances, the model 205 may be the same or similar as the language model 130 of FIG. 1. In some instances, the model 205 may interface with a second model 210, as described herein. The second model 210 may be the same or similar as the OCR model 125 of FIG. 1.

The model 205 and/or the second model 210 may obtain the electronic document 215, such as from a user via a user device. The electronic document 215 may include one or more of PDFs, pictures, document scans, digital photographs, and/or other similar electronic media. The second model 210 may be operable to perform OCR operations to the electronic document 215 and may output an OCR output 220. In some instances, the OCR output 220 may include extracted text and/or extracted bounding boxes, which may be obtained by the model 205 and used in performing the document intelligence operations to the electronic document 215, as described herein. In an example, the OCR output 220, which may include extracted text and bounding box information, may be passed to a language model 205 in a structured format such as JSON or XML. The language model 205 may then process this structured data to generate the first output 235 in a document annotation format and the second output 240 in a bounding box annotation format. The data flow between the second model 210 (e.g., an OCR model) and the language model 205 may be managed by a data ingestion engine that normalizes and optimizes the data for subsequent processing.

In some instances, the second model 210 may support full-page ingestion of the electronic document 215, allowing the second model 210 to process an entire document without fragmentation. For image-level processing, the second model 210 may identify non-text elements, such as logos, signatures, or diagrams, and may apply bounding boxes around the associated regions. The bounding boxes may be used by the model 205 to apply annotations or highlight specific areas of interest, as described herein. Alternatively, or additionally, the second model 210 may extract tables, lists, headers, and footers, and may preserve the structure thereof for integration into the output from the model 205.

Alternatively, or additionally, the model 205 may obtain an output configuration from the user. In some instances, the output configuration may include a first format 225 and/or a second format 230. The first format 225 may be document annotation format and may correspond to a first output 235 from the model 205. In some instances, the first format 225 may include a markdown format, which may be delivered to the user for display on the user device. Alternatively, or additionally, the second format 230 may be a bounding box annotation format 230 and may correspond to a second output 240 from the model 205. In some instances, the second output 240 may be a structured format, which may have the structure thereof defined by the output configuration and/or a schema included therein. The output configuration may include the schema, various toggle options (e.g., an image toggle, a header and footer toggle), and/or other user preferences to provide direction to the model 205 in annotating the electronic document 215 to generate at least a first output 235 and/or a second output 240. The output configuration may be the same or similar as the output configuration described relative to FIG. 1, including the schema, the toggle options, and so forth.

The first format 225 may be a structured output configuration designed to convert the electronic document 215 into an annotated document based on the user-defined schema. The first format 225 may enable the document intelligence system 200 to identify and annotated specific fields in the electronic document 215 and presenting the annotated document in structured manner back to the user. Once the schema is applied, the model 205 may generate a visual output that may highlight the annotated fields and/or display the first output 235 alongside the original electronic document 215 for validation. Alternatively, or additionally, the first format 225 may support iterative refinement, where the user may adjust the schema or provide feedback to improve performance of the model over time.

The second format 230 may be focused on identifying and annotating visual regions within the electronic document 215, such as images, charts, tables, or other non-text elements. Unlike the first format 225, which primarily extracts structured text fields, the second format 230 may leverage spatial analysis by the model 205 to detect and highlight specific areas of interest in the electronic document 215. Using the second format 230, the model 205 may apply bounding boxes to label particular regions of the electronic document 215, such as logos, signatures, graphs, or form fields. Alternatively, or additionally, the model 205 can also associate metadata or descriptions with each bounding box, which may provide additional context for the annotated regions. The user can review the second output 2040 alongside the electronic document 215 to ensure the visual elements may be correctly processed.

The model 205 may be a vision language model and/or a small language model operable to process, annotate, and extract structured information from the electronic document 215. In some instances, the model 205 may support full-page ingestion of the electronic document 215, enabling the model 205 to analyze entire pages without limitations of fragmented or batch processing. As such, the model 205 may capture the complete context of the electronic document 215, which may improve the accuracy of the first output 235 and/or the second output 240.

The model 205 may perform operations in at least two annotation modes: document-level annotation and/or image-level annotation. The document-level annotation may be associated with the first format 225 and/or the first output 235. In the document-level annotation, the model 205 may apply the user-defined schema to extract and structure text-based fields, such as names, dates, or financial figures, such that the first output 235 may be machine-readable and human-interpretable. The image-level annotation may be associated with the second format 230 and/or the second output 240. In image-level annotation, the model 205 may identify visual regions in the electronic document 215 using bounding boxes. The image-level annotation may be particularly useful for electronic documents where spatial context may be of particular interest, such as contracts, medical records, or technical diagrams. The dual capability annotations of the model 205 may facilitate the handling a wide range of document types.

In some instances, the model 205 may be operable to perform granular text sourcing, which may link extracted JSON fields to corresponding source regions in the electronic document 215. By mapping annotated data to specific bounding boxes, the model 205 may enable the user to visually verify the accuracy of the annotated data the user device. For instance, if the model 205 identifies an "Invoice Date" field, the model 205 can highlight the location of the same date in the electronic document 215, which may facilitate validation by the user. The granular text sourcing may be further enhanced by the model 205 automatically generating a schema associated with the electronic document 215. In some instances, the schema may be automatically generated by the model 205 after performing an analysis on the electronic document 215 and/or by leveraging a secondary model that may be specialized in schema inference. By analyzing the document's structure and content, the model 205 can propose a schema that includes relevant fields, descriptions, and data types, which may reduce the manual effort required from users.

In some instances, the model 205 may generate various notifications for the user, such as when differences may be determined between the electronic document 215 and the first output 235 and/or the second output 240. The notifications may be operable to alert the user to potential errors or omissions in the first output 235 and/or the second output 240 relative to the electronic document 215. For example, if a field included in the schema is missing or if the extracted data does not match the expected format, the model 205 may generate a notification for the user to review.

Alternatively, or additionally, the model 205 may identify URLs in the electronic document 215 and may output the URLs as clickable links. Alternatively, or additionally, in instances in which the model 205 identifies a table in the electronic document 215, the model 205 may be operable to rendering the table in HTML format in the first output 235 and/or the second output 240, which may preserve the structure of the table. In instances in which the electronic document 215 is a multi-page document, the model 205 may stitch related content across pages of the electronic document 215, including tables and/or lists, which may result in the first output 235 and/or the second output 240 maintaining logical continuity.

In some instances, the model 205 may be designed to handle nested lists, where the nested lists may be of any sized complexity. For example, the model 205 may handle a first nested list with two layers and a second nested list with five or more layers. Alternatively, or additionally, the model 205 may be operable to extract and/or annotated headers and footers in the electronic document 215. In some instances, retaining the headers and footers may be in compliance with various regulations, such as accessibility standards established by the Americans with Disabilities Act.

In some instances, the document intelligence system 200 may incorporate a human-in-the-loop workflow, where the user may be operable to review, correct, and/or refine the outputs (e.g., the first output 235 and/or the second output 240) from the model 205. The feedback obtained from the user may be used to retrain the model 205, which may result in an improved performance over time. Alternatively, or additionally, the document intelligence system 200 may employ an LLM-as-a-judge mechanism, where a second language model (not illustrated) may evaluate the outputs from the model 205 for consistency, relevance, and/or accuracy.

FIG. 3 illustrates a flowchart of an example method 300 document annotation using a document intelligence system. The method 300 may be performed by processing logic that may include hardware (circuitry, dedicated logic, etc.), software (such as is run on a general purpose computer system or a dedicated machine), or a combination of both, which processing logic may be included in any computer system or device such as the processing device 110 of FIG. 1, the model 205 of FIG. 2, the computing device 400 of FIG. 4, and/or the system 500 of FIG. 5.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification may be capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 300 may begin at block 305 where processing logic may obtain, from a user device, an electronic document to be processed by a model. In some instances, the model may be a vision language model. Alternatively, or additionally, the model may be a small language model. In some instances, the electronic document may include a native format, and the native format may be one or more of a PDF, a picture, a scan of a document, and a digital photograph.

At block 310, the processing logic may obtain an optical character recognition output of the electronic document. In some instances, the optical character recognition output may be obtained from a second model. The optical character recognition output may include extracted text and/or extracted bounding boxes from the electronic document.

At block 315, the processing logic may obtain, from the user device, an output configuration. In some instances, the output configuration may include a bounding box annotation format and/or a document format. In some instances, the output configuration may include an image toggle that may direct whether an image from the electronic document may be included in the first output or the second output.

Alternatively, or additionally, the output configuration may include a schema that may define at least one field to be identified in the electronic document. In some instances, the schema may be automatically generated using the model to include at least one of a field name, a field type, a description, and a required option toggle. Alternatively, or additionally, the schema may be automatically generated using a second model to include at least one of a field name, a field type, a description, and a required option toggle.

At block 320, the processing logic may generate a first output and a second output based on the electronic document and the optical character recognition (OCR) output. The first output and the second output may be defined by the output configuration. In some instances, the first output may be a markdown format and the second output may be a structured format.

In instances in which the model identifies a URL in the electronic document, the model may include the URL in the first output and/or the second output. Alternatively, or additionally, in instances in which the model identifies a table in the electronic document, the model may include the table in the first output and/or the second output in an HTML format.

At block 325, the processing logic may transmit the first output and the second output to the user device. In some instances, the first output and/or the second output may be transmitted to the user device to be displayed spatially adjacent to the electronic document.

At block 330, the processing logic may obtain a feedback from the user device.

At block 335, the processing logic may update the model using the feedback from the user device.

Modifications, additions, or omissions may be made to the method 300 without departing from the scope of the present disclosure. For example, the processing logic may further generate a notification that may indicate a difference between the electronic document and the first output and/or a difference between the electronic document and the second output.

In another example, the designations of different elements in the manner described is meant to help explain concepts described herein and is not limiting. Further, the method 300 may include any number of other elements or may be implemented within other systems or contexts than those described.

Figure 4:
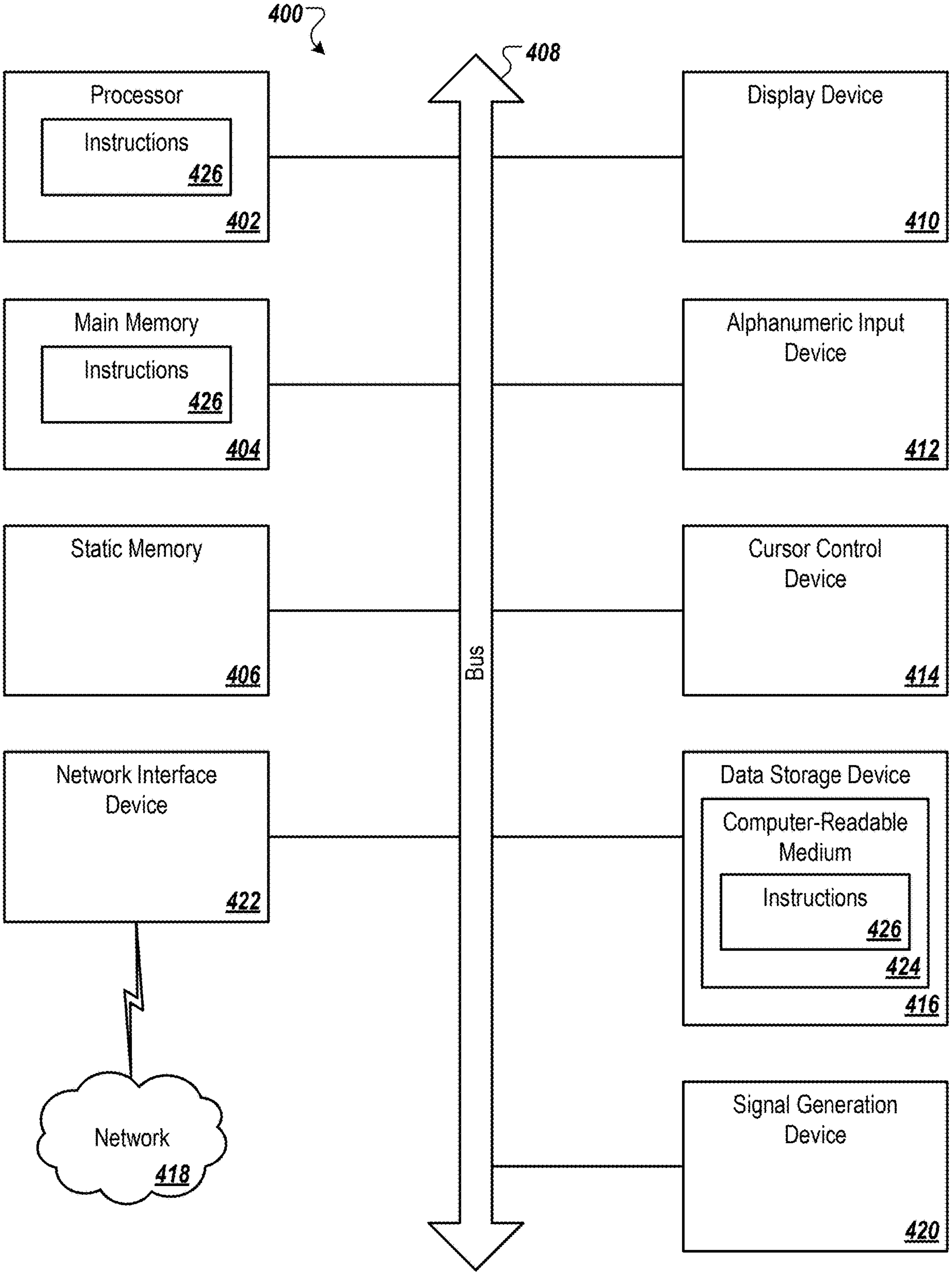
FIG. 4 illustrates an example computing device.

FIG. 4 illustrates an example computing device 400 within which a set of instructions, for causing the machine to perform any one or more of the methods discussed herein, may be executed. The computing device 400 may include a mobile phone, a smart phone, a netbook computer, a rackmount server, a router computer, a server computer, a personal computer, a mainframe computer, a laptop computer, a tablet computer, a desktop computer, or any computing device with at least one processor, etc., within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The computing device 400 includes a processing device 402 (e.g., a processor), a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

The processing device 402 represents one or more processing devices such as a microprocessor, CPU, GPU, TPU, NPU, DPU, and LPU, or the like. More particularly, the processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also include one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418 and may allow access via API, or any other interface. The computing device 400 also may include a display device 410 (e.g., a liquid crystal display (LCD), an array of light-emitting diodes (LEDs), an array of organic LEDs (OLEDs), etc.), an alphanumeric input device 412 (e.g., a keyboard), a cursor control device 414 (e.g., a mouse) and a signal generation device 420 (e.g., a speaker). In at least one implementation, the display device 410, the alphanumeric input device 412, and the cursor control device 414 may be combined into a single component or device (e.g., a touch screen).

The data storage device 416 may include a computer-readable storage medium 424 on which is stored one or more sets of instructions 426 embodying any one or more of the methods or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over the network 418 via the network interface device 422.

While the computer-readable storage medium 424 is shown in an example implementation to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media, high-bandwidth memory (HBM), and magnetic media.

Figure 5:
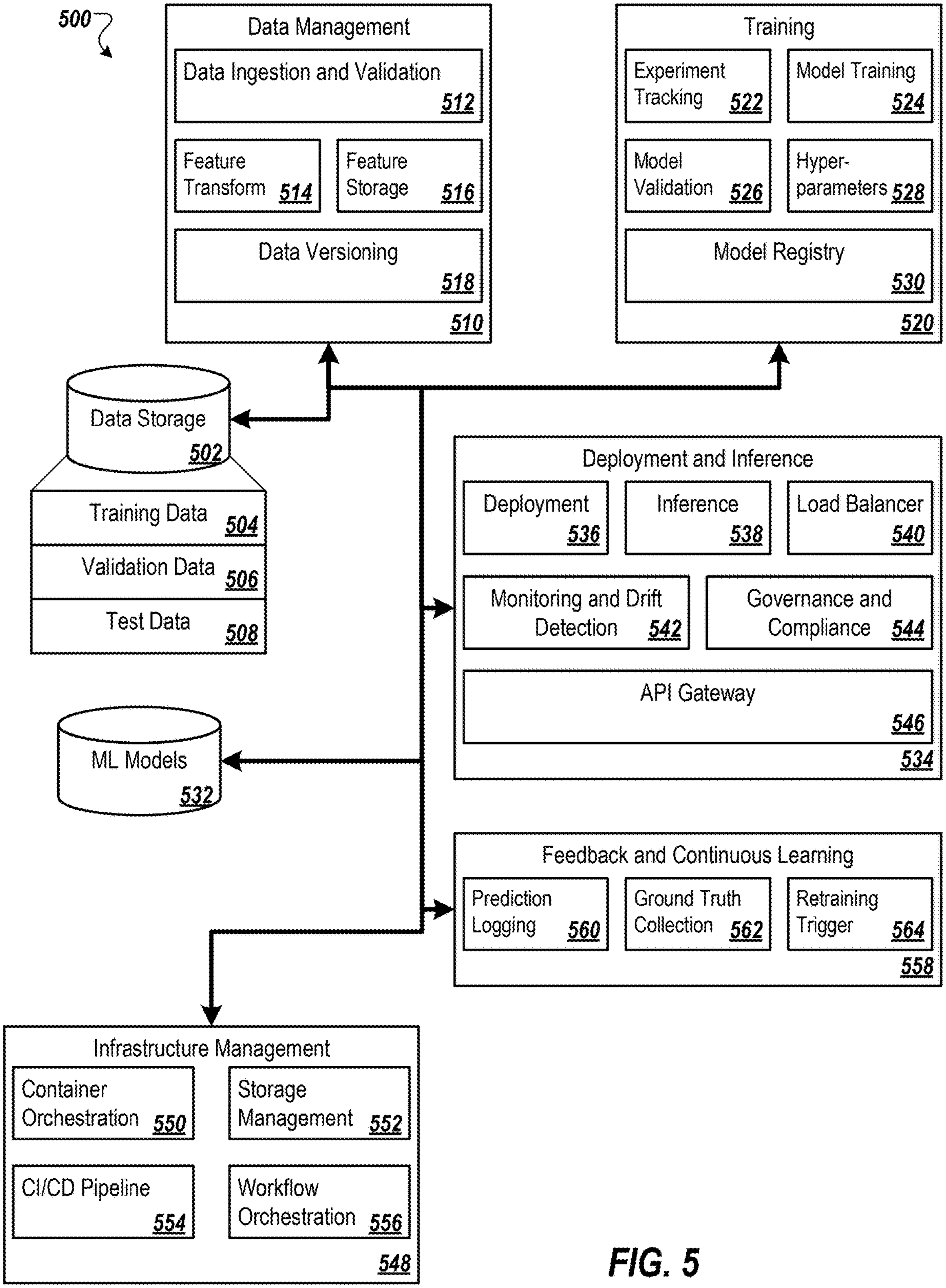
FIG. 5 illustrates a block diagram of a machine learning operations platform for managing classical machine learning workloads on structured data.

FIG. 5 is a block diagram illustrating a machine learning operations platform for managing classical machine learning workloads on structured data, according to some embodiments of the present disclosure.

System 500 may include data management engine 510 with data ingestion and validation engine 512, feature transform engine 514, feature storage engine 516, and data versioning engine 518. Data ingestion and validation engine 512 may access data from relational databases (PostgreSQL, MySQL), NoSQL databases (MongoDB, Cassandra), REST APIs, file systems (CSV, Parquet, JSON), and streaming sources (Kafka, Kinesis), performing comprehensive data quality checking including schema validation, data type verification, range validation, null handling, completeness assessment, consistency checking, and accuracy verification to address data quality problems identified as primary MLOps challenges. The engine may perform Exploratory Data Analysis (EDA) including statistical summaries, distribution analysis, correlation analysis, and outlier detection. Data versioning engine 518 may maintain complete lineage using DVC or Git-LFS with cryptographic hashing for reproducibility and provenance tracking. Data may be stored in data storage 502 containing training data 504, validation data 506, and test data 508.

Feature transform engine 514 may apply data augmentation techniques and transformations including numerical scaling (standardization, min-max), categorical encoding (one-hot, target encoding, entity augmentation), date/time extraction, text vectorization with embeddings (Word2Vec), polynomial generation, and aggregation functions. The engine may perform feature construction, feature selection using PCA and ICA, feature imputation for missing values, data cleaning (duplicates, inconsistencies), and data merging and matching across sources. Feature storage engine 516 may provide dual-mode storage with offline batch-oriented storage (Parquet on S3, Delta Lake) for training and online low-latency key-value databases (Redis, DynamoDB) for sub-millisecond inference. Features may be stored with metadata including name, type, entity key, timestamp, and lineage, with point-in-time correct retrieval preventing data leakage.

Model training engine 520 may include experiment tracking engine 522, model training engine 524, model validation engine 526, hyperparameters engine 528, and model registry engine 530. Experiment tracking engine 522 may log all training runs with hyperparameters, dataset versions, model architecture, training metrics, validation metrics, duration, resources, random seeds, business value metrics, and ethical considerations. Model training engine 524 may support ensemble methods (XGBoost, LightGBM, Random Forests, Extra Trees), linear models (Logistic Regression with L1/L2, Support Vector Machines), and additional algorithms (k-Nearest Neighbors, Naive Bayes, Decision Trees). In some embodiments, a federated learning coordinator may modify the operation of training engine 520 to execute decentralized training processes. Instead of aggregating data in data storage 502, the federated learning coordinator may distribute an initial global model to remote client devices or siloed data centers. Each client may train the model locally on private data and compute model updates (gradients or weights), which are encrypted and transmitted back to federated learning coordinator 578. The federated learning coordinator may apply secure aggregation algorithms (e.g., federated averaging) to combine updates into a new global model without ever accessing the raw local data, addressing data sovereignty and privacy regulations while using distributed computational power.

Hyperparameters engine 528 may implement automated tuning using grid search, random search, Bayesian optimization, and successive halving, balancing performance with computational efficiency and constraints like inference latency and interpretability. Model validation engine 526 may implement k-fold cross-validation with stratification, time-series cross-validation with forward chaining, and backtesting, evaluating Quality of Model (QoM) using accuracy, precision, recall, F1, AUC-ROC for classification and RMSE, MAE, R-squared for regression, assessing predictive performance, computational efficiency, interpretability, fairness, and robustness with statistical significance testing. Model registry engine 530 may maintain serialized artifacts, metadata, dataset versions, feature versions, code versions, timestamps, and complete lineage, with models progressing through development, staging, production, and archived stages, supporting A/B testing with traffic allocation and tracking business value and ethical assessments. The registry may communicate with ML models database 532.

Deployment and inference engine 534 may include deployment engine 536, inference engine 538, load balancer engine 540, monitoring and drift detection engine 542, governance and compliance engine 544, and API gateway engine 546. Deployment engine 536 may implement canary deployment (gradual traffic shifting), blue-green deployment (instant switchover), and shadow deployment (parallel execution), with containerization via Docker and orchestration via Kubernetes with horizontal autoscaling. The deployment engine 536 may include an edge deployment engine to facilitate model execution on resource-constrained devices. The edge deployment engine may perform model compression techniques including quantization (e.g. reducing precision from 32-bit floating point to 8-bit integers), pruning (removing redundant network connections), and distillation (training smaller student models from larger teacher models). The edge deployment engine may convert serialized models into hardware-optimized formats (e.g., TensorFlow Lite, ONNX, TensorRT) compatible with specific edge accelerators (TPUs, NPUs, DSPs). The edge deployment engine may also manage a synchronization protocol to push model updates to distributed edge devices over intermittent network connections and pull aggregated federated learning updates back to the central system. Inference engine 538 may provide batch prediction processing stored data and real-time inference via REST/gRPC with feature retrieval from feature storage engine 515, using request batching, model caching, connection pooling, and adaptive timeouts.

Load balancer engine 540 may distribute traffic with routing tables for A/B testing, health checking, and circuit breaking. Monitoring and drift detection engine 542 may track latency percentiles, throughput, error rates, prediction distribution, and resource utilization, detecting data drift via Kolmogorov-Smirnov test, Population Stability Index, Jensen-Shannon divergence for numerical features and chi-square test for categorical features, implementing automated drift handling including feature recalibration, model retraining triggers, and alerts. Model drift detection may identify concept drift by tracking performance metrics, comparing prediction confidence distributions, and monitoring feature importance shifts, continuously evaluating QoM to detect degradation.

Governance and compliance engine 544 may implement RBAC with SAML/OAuth integration, immutable audit logs, SHAP-based explainability, and enforce ethical AI principles including fairness evaluation (demographic parity, equalized odds), bias detection and mitigation, human value considerations, and societal impact assessment. Compliance controls may include GDPR/CCPA requirements (data subject access, right to erasure, consent management, data minimization), maintaining business value, quality metrics, and ethical assessment documentation. API gateway engine 546 may provide authentication, authorization, rate limiting, request validation, protocol translation (REST/gRPC), routing, caching, logging, service discovery, and health checking. In some embodiments, an advanced explainability and audit engine may extend the capabilities of governance and compliance engine 544 by generating counterfactual explanations (identifying minimal changes to input features required to flip a prediction decision). The advanced explainability and audit engine may provide global model interpretation via feature interaction analysis and local interpretation for specific high-risk predictions. The advanced explainability and audit engine may automatically generate regulatory compliance reports (e.g., for EU AI Act or FDA SaMD) by compiling model lineage, bias testing results from monitoring engine 542, and human-in-the-loop decision logs into an immutable audit trail, ensuring full traceability of automated decision-making processes.

Infrastructure management engine 548 may include container orchestration engine 550, storage management engine 552, CI/CD pipeline engine 554, and workflow orchestration engine 556. Container orchestration engine 550 may use Kubernetes with multiple clusters (training with GPUs, serving with autoscaling, infrastructure for orchestration/monitoring), allocating CPU/GPU/xPU resources with quotas and preemption strategies addressing resource scarcity. Storage management engine 552 may provide object storage (S3) for data, datasets, feature stores, models, and logs, with lifecycle policies, replication, encryption, data quality assurance, and provenance tracking.

CI/CD pipeline engine 554 may automate linting, unit testing, integration testing, image building, vulnerability scanning, staging deployment, end-to-end testing, and production promotion, versioning training code and pipelines with tests, validating data quality, model quality, and system quality. Workflow orchestration engine 556 may coordinate DAG-based workflows with dependency resolution, task scheduling, retry logic, timeout handling, data passing, and health monitoring for training pipelines, batch prediction, and continuous retraining workflows.

Feedback and continuous learning engine 558 may include prediction logging engine 560, ground truth collection engine 562, and retraining trigger engine 564. Prediction logging engine 560 may capture predictions with input features, model version, output, confidence, timestamp, metadata, and unique identifiers in compressed columnar formats with privacy controls. Ground truth collection engine 562 may gather outcomes via explicit feedback, implicit signals (click-through, conversion), business system updates, and manual labeling, associating labels with prediction identifiers with quality assurance, handling delayed labels, and assessing business value and human impact.

Retraining trigger engine 564 may initiate retraining via policy-based schedules, event-based triggers (data availability), or drift-based triggers (exceeding thresholds from monitoring and drift detection engine 542), implementing sophisticated drift handling balancing freshness with computational costs and business continuity. Retraining may fetch production data with ground truth, merge with historical data with recency weighting, execute training pipelines, validate against production models evaluating technical quality and business value, and promote if performance improves, creating continuous improvement loops feeding back to data management engine 510 while maintaining business value delivery and ethical AI principles.

In operational deployment, system 500 may execute continuous workflows. Data ingestion and validation engine 512 may continuously ingest data from source systems, may perform real-time quality validation, and may version each batch in data storage 502. Feature transform engine 514 may apply configured transformations and may write results to feature storage engine 516, maintaining synchronized offline and online stores. Initially, or when retraining trigger engine 564 may signal need, training engine 520 may retrieve historical features from the offline store, with experiment tracking engine 522 logging each training iteration while model training engine 524 may execute algorithms, hyperparameters engine 528 may optimize configurations, and model validation engine 526 may evaluate QoM against validation data 506. Validated models may be registered in model registry engine 530 and may be stored in ML models database 532 with complete lineage. Deployment engine 536 may execute canary or blue-green deployments, containerizing models and deploying to serving infrastructure via container orchestration engine 550. Production inference requests may arrive at API gateway engine 546, which may authenticate and may route to load balancer engine 540, distributing traffic across inference engine 538 instances. For each request, inference engine 538 may retrieve current features from the online feature store, may apply transformations, may invoke the model, and may return predictions. Simultaneously, prediction logging engine 560 may capture all predictions with inputs and outputs. Monitoring and drift detection engine 542 may continuously analyze incoming data distributions, model performance metrics, and prediction patterns, detecting data drift via statistical tests and model drift via performance degradation. When drift may exceed configured thresholds or scheduled intervals may occur, retraining trigger engine 564 may initiate automated retraining by signaling training engine 520, which may fetch recent production data merged with ground truth labels collected by ground truth collection engine 562. The newly trained model may undergo validation against the current production model, and if QoM may improve beyond significance thresholds while maintaining ethical standards verified by governance and compliance engine 544, deployment engine 536 may promote the new model version through staged rollout. This may create a closed-loop system where production data may continuously improve models without manual intervention. Workflow orchestration engine 556 may coordinate all activities as DAG-based workflows, managing dependencies between data ingestion, feature engineering, training, deployment, and monitoring tasks, with CI/CD pipeline engine 554 ensuring all code changes may undergo automated testing before deployment, maintaining system reliability while enabling rapid iteration.

Security management engine 570 may implement end-to-end encryption protocols, securing data at rest within data storage 502 and feature storage engine 516, and securing data in transit during communication between engines. The engine may manage cryptographic keys through a dedicated Key Management Service (KMS) with automatic rotation policies. Further, security management engine 570 may implement differential privacy techniques during the training phase, injecting statistical noise into gradients to prevent model inversion attacks or membership inference attacks, thereby ensuring that individual data points cannot be reverse-engineered from the trained model artifacts stored in model registry engine 530.

Cost management and optimization engine 572 may monitor computational expenditure across infrastructure management engine 548. It may implement budget attribution tagging to specific projects or departments and provide real-time cost forecasting. The engine may dynamically optimize resource allocation by leveraging spot instances for interruptible workloads (such as batch training or hyperparameter tuning) and reserved instances for steady-state workloads (such as model serving), automatically migrating workloads based on price-performance heuristics. Additionally, it may identify idle resources, such as unattached GPU volumes or stalled notebook sessions, and trigger automated shutdown or archival procedures to enforce financial efficiency.

Interactive development environment (IDE) engine 576 may provide a collaborative workspace connected to data management engine 510 and training engine 520. This engine may support multi-tenant kernels, allowing data scientists to share memory contexts and computing resources securely. It may implement background versioning, automatically linking code execution to experiment tracking engine 522, ensuring that ad-hoc experiments are reproducible. The IDE engine may also include a visual pipeline builder, enabling users to define directed acyclic graphs (DAGs) for workflow orchestration engine 556 using a drag-and-drop interface that compiles into executable pipeline code (e.g., Airflow or Kubeflow pipelines).

Components of system 500 may communicate via I/O devices and network interfaces. Each engine may be a module implemented using computing devices with load-balancing for stable resource distribution. The platform may address common MLOps challenges including data quality problems, resource limitations, and deployment difficulties through integrated automation and comprehensive quality management spanning the entire machine learning lifecycle.

Figure 6:
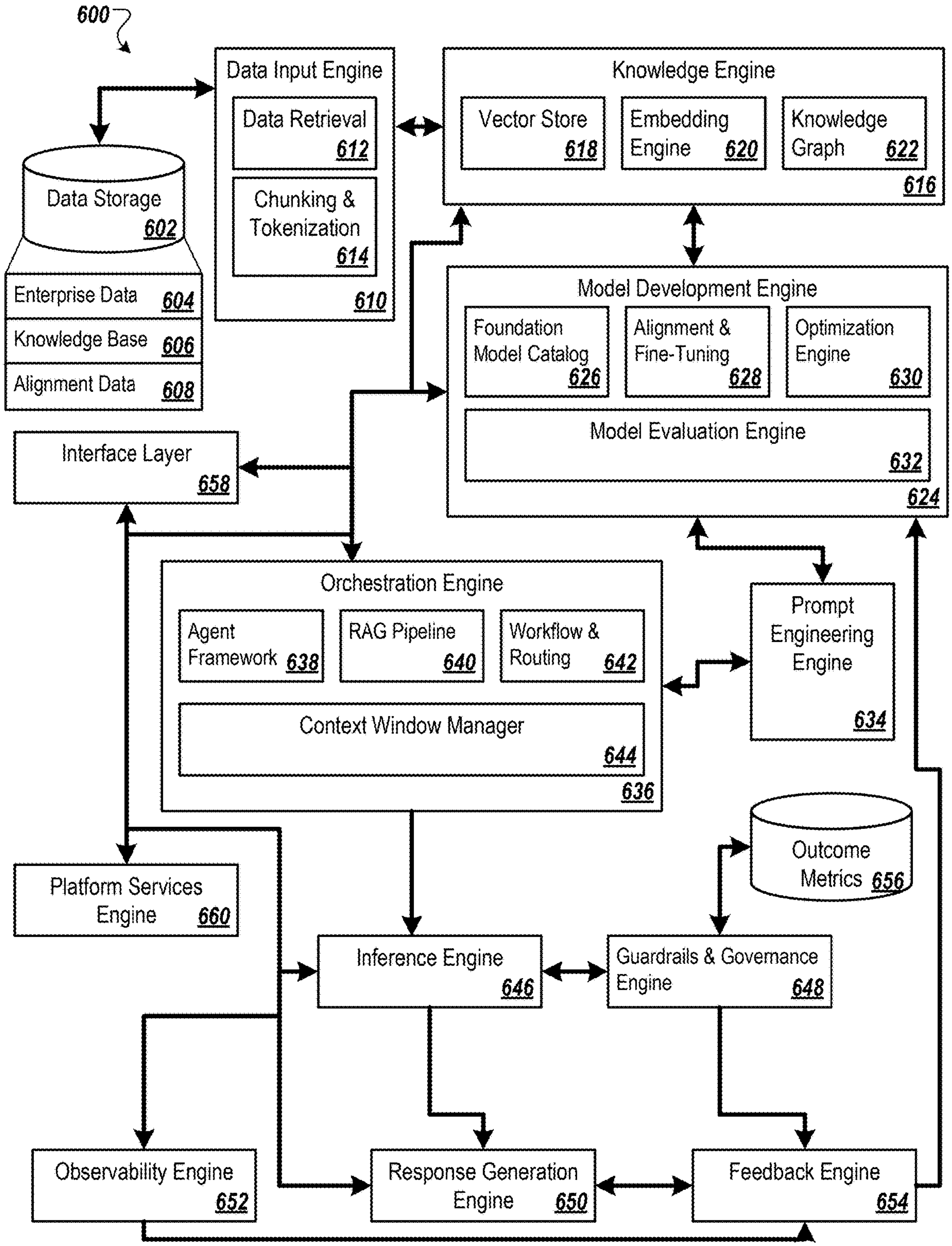
FIG. 6 illustrates a block diagram of a Generative Artificial Intelligence (GenAI) and Large Language Model Operations (LLMOps) system architecture.

FIG. 6 illustrates a block diagram of a Generative Artificial Intelligence (GenAI) and Large Language Model Operations (LLMOps) system architecture 600 according to one or more embodiments. The system architecture 600 may comprise a data storage 602, a data input engine 610, a knowledge engine 616, a model development engine 624, a prompt engineering engine 634, an orchestration engine 636, an inference engine 646, a guardrails and governance engine 648, a response generation engine 650, an observability engine 652, a feedback engine 654, an outcome metrics store 656, an interface layer 658, and a platform services engine 660.

The data storage 602 may comprise enterprise data 604 including structured databases, unstructured data lakes, real-time streaming data, Application Programming Interface (API) endpoints, and document repositories; knowledge base 606 containing domain-specific documentation and reference materials for Retrieval-Augmented Generation (RAG); and alignment data 608 including instruction-tuning datasets, human preference data for Reinforcement Learning from Human Feedback (RLHF) and Direct Preference Optimization (DPO), and multi-modal inputs for model alignment.

The data input engine 610 may be communicatively coupled to the data storage 602 and may include a data retrieval component 612 that may fetch data via database connectors, API calls, and streaming consumers, and a chunking and tokenization component 614 that may segment documents for embedding, may apply tokenization using Byte-Pair Encoding (BPE) or SentencePiece, may perform Personally Identifiable Information (PII) detection and masking, and may maintain data lineage tracking.

The knowledge engine 616 may be communicatively coupled to the data input engine 610 and may include a vector store 618 providing embedding storage with Approximate Nearest Neighbor (ANN) based similarity search, hybrid dense/sparse retrieval, namespace isolation, and metadata filtering; an embedding engine 620 that may generate vector representations; and a knowledge graph 622 that may perform entity extraction, relationship mapping, ontology management, graph traversal, and semantic reasoning supporting Graph RAG.

The model development engine 624 may be communicatively coupled to the knowledge engine 616 and may include a foundation model catalog 626 that may maintain a registry of approved models, Low-Rank Adaptation (LoRA) and Quantized Low-Rank Adaptation (QLoRA) adapter weights, versions, artifacts, lineage tracking, and stage transitions with access control; an alignment and fine-tuning component 628 that may support Parameter-Efficient Fine-Tuning (PEFT) methods, instruction tuning, RLHF, DPO, Odds Ratio Preference Optimization (ORPO), constitutional Artificial Intelligence (AI), domain adaptation, and adapter composition; an optimization engine 630 that may perform quantization (INT4/INT8/FP8), pruning, sparsification, knowledge distillation, model merging, speculative decoding, and Key-Value (KV) cache optimization; and a model evaluation engine 632 that may provide perplexity measurement, Bilingual Evaluation Understudy (BLEU) and Recall-Oriented Understudy for Gisting Evaluation (ROUGE) scores, human preference evaluation, LLM-as-judge auto-evaluation, A/B testing, red teaming, and hallucination detection.

The prompt engineering engine 634 may be communicatively coupled to the model development engine 624 and may manage prompt templates, version control, chain-of-thought and meta-prompting, few-shot management, prompt optimization, A/B testing, dynamic prompting, prompt chaining, and playgrounds, supporting Chain of Thought, Tree of Thought, ReAct, and Assumed Expertise patterns.

The orchestration engine 636 may be communicatively coupled to the prompt engineering engine 634 and knowledge engine 616, and may include an agent framework 638 that may provide multi-agent orchestration, tool use, function calling, planning, reasoning, goal decomposition, self-reflection, human-in-the-loop controls, and memory management; a RAG pipeline 640 that may perform query understanding, dense/sparse/hybrid retrieval, reranking, context augmentation, citation generation, and grounding with agentic and corrective RAG support; a workflow and routing component 642 that may provide Directed Acyclic Graph (DAG) orchestration, conditional branching, parallel execution, state management, error handling, async processing, multi-model gateway, dynamic model selection, cost-aware routing, and load balancing; and a context window manager 644 that may handle context optimization, long-context strategies, summarization, sliding windows, priority-based pruning, and semantic caching.

The interface layer 658 may be communicatively coupled to the orchestration engine 636 and may provide chat interfaces, Integrated Development Environment (IDE) plugins, admin dashboards, mobile apps, voice interfaces, widgets, messaging integrations, API playgrounds, and no-code builders, handling external integrations with enterprise systems, identity providers, APIs, Model Context Protocol (MCP) servers, and webhooks.

The inference engine 646 may be communicatively coupled to the orchestration engine 636 and may provide Large Language Model (LLM) serving via vLLM, TensorRT-LLM, or Text Generation Inference (TGI), implementing continuous batching, PagedAttention, tensor/pipeline parallelism, streaming generation, and multi-Graphics Processing Unit (GPU) inference, with API gateway functionality including rate limiting, authentication, validation, and metering, plus semantic caching, KV cache optimization, and prefix caching. A model cascade engine 672 may function as a specialized component of orchestration engine 636. This engine may implement a tiered routing strategy based on query complexity scoring, intent classification, and cost-latency constraints. The model cascade engine 672 may initially route requests to a lightweight, low-latency model (e.g., a 7B parameter model or a quantified SLM); if the confidence score of the response falls below a configured threshold, the model cascade engine 672 may automatically escalate the request to a more capable foundation model (e.g., a 70B+ parameter model or proprietary frontier model). The model cascade engine 672 may also perform "token arbitrage," dynamically selecting the most cost-effective provider for a given prompt length and required capability level, managing API budgets in real-time.

The guardrails and governance engine 648 may be communicatively coupled to the inference engine 646 and may provide input guardrails including prompt injection detection, jailbreak prevention, and validation; output guardrails including content filtering, toxicity detection, PII redaction, hallucination detection, and factuality checking; and governance controls including policy enforcement, audit logging, data residency, General Data Protection Regulation (GDPR), California Consumer Privacy Act (CCPA), System and Organization Controls 2 (SOC2), Health Insurance Portability and Accountability Act (HIPAA), and European Union (EU) AI Act compliance, bias detection, fairness assessment, and explainability features.

The response generation engine 650 may be communicatively coupled to the inference engine 646 and guardrails and governance engine 648, formatting responses after validation with streaming delivery, multi-modal formatting, and citations. Response generation engine 650 may include a content provenance and watermarking engine. The content provenance and watermarking engine may embed imperceptible cryptographic watermarks into generated text (using token selection biasing or synonym substitution patterns) and generated images/audio (using spectral modifications) to establish machine authorship. The content provenance and watermarking engine may implement C2PA (Coalition for Content Provenance and Authenticity) standards to cryptographically sign metadata associated with the output, linking the generated content back to the specific model version, system prompt, and retrieved knowledge chunks used in its creation. This ensures verifiable distinctness between human-created and AI-generated content for regulatory compliance and copyright protection.

The observability engine 652 may be communicatively coupled to the inference engine 646 and response generation engine 650, providing latency monitoring (P50/P95/P99), throughput metrics, time to first token, error rates, GPU utilization, alerting, logging, token usage tracking, prompt versioning, distributed tracing with LLM-specific spans, quality scoring, and drift detection.

The feedback engine 654 may be communicatively coupled to the response generation engine 650 and outcome metrics store 656, collecting explicit feedback including ratings and preference comparisons, capturing implicit signals, managing annotation pipelines, implementing active learning, and curating datasets.

The outcome metrics store 656 may be communicatively coupled to the guardrails and governance engine 648, feedback engine 654, and model development engine 624, persisting quality scores, token costs, usage patterns, drift results, and preference signals, thereby providing a feedback loop for continuous model improvement.

The platform services engine 660 may provide cross-cutting infrastructure communicatively coupled to the orchestration engine 636 and inference engine 646, including Continuous Integration and Continuous Deployment (CI/CD) pipelines with GitOps, deployment automation, canary releases, rollback, infrastructure as code, container orchestration, secret management, cost management, experiment tracking, collaboration tools, and low-code tooling supporting an expanded builder persona.

Synthetic data generation engine 670 may be communicatively coupled to model development engine 624 and knowledge engine 616. This engine may use larger "teacher" models to generate diverse instruction-response pairs, reasoning traces, and edge-case scenarios based on documents retrieved from knowledge base 606. It may implement automated quality filtering pipelines that evaluate synthetic examples for factual correctness, logical consistency, and adherence to style guides before depositing them into alignment data 608. The engine may further employ "self-instruct" protocols to iteratively expand the complexity of training data, thereby enabling the training of smaller, task-specific "student" models (e.g. small language models, SLMs) that achieve high performance with reduced inference costs.

Confidential computing enclosure 672 may provide a Trusted Execution Environment (TEE) for sensitive components of inference engine 646 and knowledge engine 616. This enclosure may ensure that data-in-use, including user prompts, retrieved RAG context, and model weights, remains encrypted within memory during processing. It may use hardware-based isolation technologies (such as Intel SGX, AMD SEV, or NVIDIA Confidential Computing) to prevent the cloud provider or unauthorized root users from accessing decrypted tensors or embedding vectors. This allows the system to process highly regulated data (PII, PHI, trade secrets) on public cloud infrastructure while maintaining cryptographic isolation.

Multi-modal processing engine 674 may extend the capabilities of data input engine 610 and embedding engine 620. It may comprise specialized encoders for non-textual data, including Vision Transformers (ViT) for image understanding and audio encoders (e.g., Whisper) for speech transcription. This engine may project different modalities into a shared high-dimensional semantic space (e.g., using CLIP or SigLIP methodologies), enabling "cross-modal retrieval" where a text query can retrieve relevant images, audio clips, or video segments from vector store 618. It may also implement "visual prompting," allowing users to upload images as context alongside text instructions for the inference engine 646.

In operation, the interface layer 658 may receive user requests and may transmit them to the orchestration engine 636, which may process requests using the agent framework 638, RAG pipeline 640, and workflow component 642. The RAG pipeline 640 may retrieve context from the knowledge engine 616 for grounding. The orchestration engine 636 may transmit requests to the inference engine 646, which may generate responses using models from catalog 626 with prompts from engine 634. The guardrails and governance engine 648 may validate responses, the response generation engine 650 may deliver them via interface layer 658, and feedback engine 654 may collect feedback. The outcome metrics store 656 may aggregate metrics for continuous improvement via model development engine 624, while platform services engine 660 may provide infrastructure support throughout.

During day-to-day operation, the system architecture 600 may operate in two concurrent modes: a request-response mode for serving end users and a continuous improvement mode for maintaining and enhancing model quality. In request-response mode, a user request may arrive at the interface layer 658 via API call, chat message, or integrated application. The orchestration engine 636 may analyze the request to determine whether retrieval augmentation is required, selecting an appropriate workflow path. For knowledge-intensive queries, the RAG pipeline 640 may query the vector store 618 to retrieve semantically relevant document chunks, which may be reranked and injected into the prompt context. The context window manager 644 may optimize the assembled context to fit within model token limits, potentially summarizing or pruning lower-priority content. The inference engine 646 may then execute the generation request, batching it with other concurrent requests to maximize GPU utilization, while streaming tokens back to the user as they are generated. The guardrails and governance engine 648 may intercept both the input prompt and output response in real-time, blocking or modifying content that violates policy constraints. Each request may be logged by the observability engine 652 with full traceability including latency breakdowns, token counts, model version, and prompt template identifiers.

In continuous improvement mode, the platform services engine 660 may orchestrate scheduled and event-driven workflows that maintain system health and model quality. The feedback engine 654 may continuously aggregate user signals, and when sufficient preference data accumulates, may trigger the alignment and fine-tuning component 628 to generate updated adapter weights. The model evaluation engine 632 may run automated benchmark suites against candidate models, comparing performance against baseline metrics stored in outcome metrics store 656. Upon passing evaluation thresholds, the platform services engine 660 may execute a canary deployment, routing a small percentage of traffic to the new model version while the observability engine 652 monitors for quality regressions or latency degradation. If metrics remain healthy, traffic may be gradually shifted until the new model serves all requests. Concurrently, the data input engine 610 may process newly ingested documents, the embedding engine 620 may generate vectors, and the vector store 618 may update its indices, ensuring the knowledge engine 616 reflects current enterprise knowledge. This dual-mode operation may enable the system architecture 600 to serve low-latency user requests while continuously adapting to new data, user feedback, and evolving requirements without service interruption.

In some examples, a system may implement a hybrid processing pipeline that combines Optical Character Recognition (OCR) with Vision Language Models (VLMs) to perform structured data annotation in electronic documents. This pipeline may allow for more accurate and comprehensive data annotation by leveraging both text and visual information from the documents.

In some examples, a system may enforce specific output structures during token generation using grammar rules. This may ensure that the annotated data conforms to predefined schemas or formats, enhancing the usability and consistency of the output.

In some examples, a system may include a validation user interface that allows users to verify accuracy of annotated data and provide feedback. This interface may facilitate a feedback loop where users can correct errors and improve a model performance over time.

In some examples, a system may use a composite API approach to intelligently chain OCR and Large Language Model (LLM) models. This approach may optimize the processing pipeline by dynamically selecting and configuring models based on the specific requirements of each document and task.

In some examples, a system may incorporate a feedback mechanism to capture user corrections and fine-tune a machine-learning model. This mechanism may enable continuous learning and improvement of the model, leading to increased accuracy and performance over time.

In some examples, a system may provide granular traceability by linking extracted text fields back to their source pixels in an original document. This feature may allow users to easily verify the accuracy of the extraction and understand the context of the extracted data.

In some examples, a system may implement a structured feedback loop that captures differential objects containing the original model output, user-corrected values, confidence scores, and document context. This structured feedback may be used to systematically improve the model performance and accuracy.

In some examples, a system may include automated grammar inference capabilities to suggest optimal JSON schemas based on the visual structure and content of the document. This feature may simplify the configuration process and ensure that the output structure is well-suited to document content.

In some examples, a system may employ a dual pipeline where an OCR model extracts both text and images from the document, and an LLM processes the extracted content with vision capabilities. This dual pipeline may enable more comprehensive and accurate data extraction by leveraging both textual and visual information.

In some examples, a system may be designed to optimize the performance-to-efficiency ratio, allowing it to operate effectively on both local devices and server-based environments. This flexibility may ensure high accuracy and low latency across a variety of deployment scenarios.

In some examples, a system may be capable of handling various document types and use cases with a single model. This versatility may reduce the complexity and cost associated with managing multiple specialized models for different document types.

In some examples, a system may incorporate human-in-the-loop (HIL) improvements by using an LLM to evaluate and refine model outputs. This approach may combine the strengths of human expertise and machine learning to achieve optimal results.

In some examples, a system may add an intelligence layer on top of raw OCR output to enhance the extracted data. This layer may provide additional context, structure, and meaning to the raw text, making it more useful and actionable.

In some examples, a system may implement a composite API/workflow pipeline to intelligently chain OCR and LLM models based on user needs. This pipeline may dynamically configure and optimize the processing workflow for each document and task.

In some examples, a system may provide end-to-end orchestration from PDF input to structured (e.g., JSON) output. This comprehensive approach may streamline the document processing workflow and ensure consistent, high-quality results.

In some examples, a system may integrate OCR and a visual language model (VLM) to extract both text and images from documents. This integration may enable more comprehensive data extraction and enhance the system ability to understand and process complex documents.

In some examples, a system may use a guidance library to enforce grammar rules during token generation. This may ensure that the output conforms to predefined schemas or formats, enhancing the usability and consistency of the extracted data.

In some examples, a system may include an API design that accepts any PDF type and user-defined schema. This flexibility may allow the system to handle a wide variety of documents and annotation requirements.

In some examples, a system may provide a builder workflow for configuring and validating an annotation pipeline. This workflow may guide users through the process of setting up and testing the document processing pipeline, ensuring optimal performance and accuracy.

In some examples, a user interface may include a drag-and-drop interface for uploading files to be processed by the document intelligence system. This interface may allow users to easily upload documents by dragging and dropping files into a designated area, simplifying the document submission process.

In some examples, a user interface may provide a side-by-side view displaying annotated data adjacent to the original document image for comparison and validation. This feature may enable users to easily compare the annotated data with the original document, facilitating accurate verification and validation of the annotation results.

In some examples, a user interface may include a validation user interface that allows users to verify the accuracy of annotated data. This interface may provide tools and visual aids to help users assess the quality of the annotated data and identify any errors or discrepancies.

In some examples, a user interface may incorporate a hovering feature that highlights the source location on the original document when a user hovers over annotated text in the output table. This feature may help users understand the context and origin of the annotated data, enhancing the verification process.

In some examples, a user interface may provide a correction mechanism that allows users to manually edit annotated fields. This mechanism may enable users to correct any errors in the annotated data, ensuring the accuracy and reliability of the final output.

In some examples, a user interface may include a visual highlighting feature that shows the source pixels on the original document when a user selects a specific field in the interface. This feature may help users visualize the exact location of the annotated data within the original document, aiding in the verification and validation process.

In some examples, a user interface may provide an interface for users to upload files and configure the annotation pipeline. This interface may allow users to experiment with different configurations and settings, facilitating the optimization of the annotation process for their specific needs.

In some examples, a user interface may include a builder workflow interface for configuring and validating the annotation pipeline. This interface may guide users through the process of setting up and testing the annotation pipeline, ensuring that it is properly configured for optimal performance.

In some examples, a user interface may provide an interactive table for users to view and edit annotated data. This table may allow users to easily navigate, review, and modify the annotated data, enhancing the usability and functionality of the interface.

In some examples, a user interface may incorporate a visual verification layer that links semantic output to spatial coordinates on the source document image. This layer may provide a visual representation of the relationship between the annotated data and its location within the original document, aiding in the verification and validation process.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A system, comprising:

a processor; and a memory storing instructions that, when executed by the processor, cause the system to:

obtain, from a user device, an electronic document to be processed by a model;

obtain an optical character recognition output of the electronic document;

obtain, from the user device, an output configuration;

generate a first output and a second output based on the electronic document and the optical character recognition output, wherein the first output and the second output are defined by the output configuration;

generate a notification that indicates a difference between the electronic document and the first output or a difference between the electronic document and the second output; and transmit the first output and the second output to the user device.

2. The system of claim 1, wherein the optical character recognition output is obtained from a second model.

3. The system of claim 2, wherein the optical character recognition output comprises extracted text and extracted bounding boxes from the electronic document.

4. The system of claim 1, wherein the model is a vision language model.

5. The system of claim 1, wherein the output configuration comprises a bounding box annotation format and a document format.

6. The system of claim 1, wherein the output configuration comprises a schema that defines at least one field to be identified in the electronic document.

7. The system of claim 6, the instructions to further cause the system to automatically generate the schema using the model to include at least one of a field name, a field type, a description, and a required option toggle.

8. The system of claim 6, the instructions to further cause the system to automatically generate the schema using a second model to include at least one of a field name, a field type, a description, and a required option toggle.

9. The system of claim 1, wherein the output configuration comprises an image toggle that directs whether an image from the electronic document is included in the first output or the second output.

10. The system of claim 1, wherein the first output is a markdown format and the second output is a structured format.

11. The system of claim 1, wherein the first output or the second output are transmitted to the user device to be displayed spatially adjacent to the electronic document.

12. The system of claim 1, wherein the electronic document comprises a native format, and the native format is one or more of a PDF, a picture, a scan of a document, and a digital photograph.

13. The system of claim 1, wherein in response to the model identifying a URL in the electronic document, including the URL in the first output or the second output.

14. The system of claim 1, wherein in response to the model identifying a table in the electronic document, including the table in the first output or the second output in an HTML format.

15. The system of claim 1, the instructions to further cause the system to:

obtain a feedback from the user device; and update the model using the feedback from the user device.

16. A method, comprising:

obtaining, from a user device, an electronic document to be processed by a model;

obtaining an optical character recognition output of the electronic document;

obtaining, from the user device, an output configuration;

generating a first output and a second output based on the electronic document and the optical character recognition output, wherein the first output and the second output are defined by the output configuration;

generating a notification that indicates a difference between the electronic document and the first output or a difference between the electronic document and the second output; and transmitting the first output and the second output to the user device.

17. The method of claim 16, wherein:

the optical character recognition output is obtained from a second model; and the optical character recognition output comprises extracted text and extracted bounding boxes from the electronic document.

18. The method of claim 16, wherein the output configuration comprises a schema that defines at least one field to be identified in the electronic document.

19. The method of claim 18, further comprising automatically generating the schema using the model to include at least one of a field name, a field type, a description, and a required option toggle.

20. The method of claim 18, further comprising obtaining a feedback from the user device; and updating the model using the feedback from the user device.

* * * * *